United States Patent [19]

Watanabe et al.

[11] Patent Number: 5,296,554
[45] Date of Patent: Mar. 22, 1994

[54] ADHESIVE RESIN COMPOSITION

[75] Inventors: Kazuyuki Watanabe; Yuji Kira, both of Oita, Japan

[73] Assignee: Showa Denko K.K., Tokyo, Japan

[21] Appl. No.: 43,892

[22] Filed: Apr. 7, 1993

Related U.S. Application Data

[63] Continuation-in-part of Ser. No. 783,246, Oct. 28, 1991, abandoned.

[51] Int. Cl.$^5$ .............. C08L 23/08; C08L 23/16; C08L 33/00
[52] U.S. Cl. ................... 525/207; 524/517; 428/476.9; 428/518; 428/516
[58] Field of Search ............................ 525/207

[56] References Cited

U.S. PATENT DOCUMENTS

| | | | |
|---|---|---|---|
| 3,765,829 | 10/1973 | Lamber et al. | 525/193 |
| 4,877,827 | 10/1989 | Van Der Groep | 525/222 |
| 4,948,850 | 8/1990 | Hasenbein et al. | 525/329.5 |
| 4,997,880 | 3/1991 | Van Der Groep | 525/222 |

FOREIGN PATENT DOCUMENTS

| | | |
|---|---|---|
| 0138083 | 4/1985 | European Pat. Off. |
| 0312664 | 4/1989 | European Pat. Off. |
| 0316037 | 5/1989 | European Pat. Off. |
| 8503512 | 8/1985 | PCT Int'l Appl. |

*Primary Examiner*—Carman J. Seccuro, Jr.
*Attorney, Agent, or Firm*—Antonelli, Terry, Stout & Kraus

[57] ABSTRACT

An adhesive resin composition comprises (A) 2 to 98% by weight of an ethylene copolymer resin containing 0.01 to 20% by weight of the unit of an unsaturated carboxylic acid anhydride in the main chain; and (B) 98 to 2% by weight of a resin mixture comprising (i) 50 to 90% by weight of a copolymer resin of ethylene/vinyl acetate, (ii) 40 to 9.5% by weight of a binary copolymer resin of ethylene and an α-olefin having 3 to 12 carbon atoms, and (iii) 10 to 0.5% by weight of an ethylene/propylene/unconjugated diene terpolymer. The resin mixture is obtained by mixing (i), (ii) and (iii) in a molten state and has a toluene extraction residue of 10 to 60% by weight. The adhesive resin composition is utilized as an adhesive material between layers of a multi-layer laminate and scrap or waste material from the adhesive resin composition or from the multilayer laminate can be recycled as an adhesive resin composition having excellent interlayer strength and compatibility.

2 Claims, No Drawings

5,296,554

ADHESIVE RESIN COMPOSITION

REFERENCE TO RELATED APPLICATION

This application is a continuation-in-part application of application Ser. No. 07/783,246 filed Oct. 28, 1991, now abandoned.

BACKGROUND OF THE INVENTION

1. Field of the Invention

The present invention relates to an adhesive resin composition which is utilized as an adhesive material between layers of a multi-layer laminate. Scrap or waste material from the adhesive resin or from the multi-layer laminate can be recycled as an adhesive resin composition.

2. Description of the Related Arts

In recent years, resin containers having the gas barrier property have been widely used in place of metal containers, particularly in the area of food containers. The resin containers have the advantage of good appearance, cleanness, light weight and good productivity which are lacking in metal containers.

The resin containers having the oxygen gas barrier property are prepared by molding multi-layer laminates or multi-layer sheets formed by laminating a resin having the oxygen gas barrier property, such as polyamide resins (sometimes abbreviated to "PA" hereinafter), polyvinylidene chloride copolymer resins and saponified products of ethylene-vinyl acetate copolymers (sometimes abbreviated to "EVOH" hereinafter), to polyolefin resins. The multi-layer laminates are generally prepared by forming an adhesive layer of various kinds of adhesive resins between the layers because adhesion between the resin having the oxygen gas barrier property and the polyolefin resin is generally poor.

When PA is used as the resin having the oxygen gas barrier property, polyolefin resins modified with an acid anhydride, such as maleic anhydride, are generally used as the adhesive resin. Blends of olefin resins with a copolymer of an α-olefin and an α,β-unsaturated carboxylic acid or an ester thereof, a polyolefin resin modified by grafting of an α,β-unsaturated carboxylic acid, an ionomer resin obtained by ionizing a copolymer of ethylene and methacrylic acid or an ester thereof with sodium, zinc, magnesium or the like or an ethylene-propylene-diene rubber modified with maleic anhydride have also been proposed as the adhesive resin.

When EVOH is used as the resin having the oxygen gas barrier property, resins obtained by grafting or copolymerization of an unsaturated carboxylic acid, an acid anhydride or an ester monomer to a polyolefin resin are used as the adhesive resin U.S. Pat. Nos. 4,026,967 and 3,953,655, Japanese Patent Application Laid-Open No. 98784/1976 and Japanese Patent Publication Nos. 15423/1969 and 4822/1974).

When containers are formed by molding from the multi-layer laminate or the multi-layer sheet, a considerable amount of scrap material is formed. The amount of the scrap material is 40% in some molding methods. Utilization by recycling of the waste plastics is urged by the society for protection of resources on the earth.

Because of this social requirement, improvement of the overall recycling of the utilized materials by addition of the adhesive resins described above as a compatibilizer is under investigation with some resin compositions and in the production of molded products from the resin compositions.

However, the method of recycling for reuse by addition of the adhesive resins as described above have problems that interlayer strength is decreased to a great extent to cause separation of the layers and that gel is formed and yellow discoloring occurs because of the unreacted monomer for the modification remaining in the adhesive resin.

SUMMARY OF THE INVENTION

The object of the present invention is to overcome the problems described above and to provide an adhesive resin composition which is utilized as an adhesive material between layers of a multi-layer laminate and scrap or waste material from which or from the multi-layer laminate can be recycled as an adhesive resin composition without additional treatment.

It was discovered by the present inventors that the object described above can be achieved by a composition comprising an ethylene copolymer resin containing the unit of an unsaturated carboxylic acid anhydride in the main chain and a specific mixture obtained by mixing of an ethylene/vinyl acetate copolymer, an ethylene/α-olefin copolymer and an ethylene-propylene/unconjugated diene terpolymer in a molten state. The present invention was completed on the basis of the discovery.

Thus, the adhesive resin composition of the invention comprises:

(A) 2 to 98% by weight of an ethylene copolymer resin containing 0.01 to 20% by weight of the unit of an unsaturated carboxylic acid anhydride in the main chain; and (B) 98 to 2% by weight of a resin mixture comprising:
 (i) 50 to 90% by weight of an copolymer resin of ethylene/vinyl acetate copolymer resin,
 (ii) 40 to 9.5% by weight of a binary copolymer resin of ethylene and an α-olefin having 3 to 12 carbon atoms, and
 (iii) 10 to 0.5% by weight of an ethylene/propylene/unconjugated diene terpolymer,
said resin mixture being obtained by mixing (i), (ii), and (iii) in a molten state and having a toluene extraction residue of 10 to 60% by weight.

Other and further objects, features and advantages of the invention will appear more fully from the following description.

DESCRIPTION OF PREFERRED EMBODIMENTS

The invention is described in detail in the following.

The ethylene copolymer resin utilized as the component (A) in the invention is a resin obtained by copolymerization of ethylene as the main component and an unsaturated carboxylic acid anhydride monomer as at least one of the comonomers constituting the main chain of the copolymer.

Examples of the unsaturated carboxylic acid anhydride monomer are maleic anhydride, itaconic anhydride, endic anhydride, citraconic anhydride and the like. The content of the anhydride monomer in the copolymer is 0.01 to 20% by weight and preferably 0.2 to 10% by weight. When the content is less than 0.01% by weight, the interlayer strength is decreased and the compatibility causes problem. When the content is more than 20% by weight, discoloration and gelation may occur during the recycling.

The ethylene copolymer resin utilized as the component (A) has a MFR generally of 0.1 to 100 g/10 min and preferably of 0.3 to 80 g/10 min. The MFR is measured according to the method of Japanese Industrial Standard K6760 at 190° C. under the load of 2.16 kg. When the MFR is less than 0.1 g/10 min, the flow property of the resin is inferior and appearance of the molded product from the resin is not good. When the MFR is more than 100 g/10 min, the compatibility with the component (B) of the adhesive resin composition is inferior and the interlayer strength is decreased.

The resin of the component (A) may comprise a radical polymerizable monomer as the third component of the resin. Examples of the radical polymerizable monomer are ester compounds, such as vinyl acetate, acrylic esters and the like, amide compounds, such as (meth)acrylamide, N-alkylacrylamide and the like, acid compounds, such as (meth)acrylic acid, maleic acid and the like, ether compounds, such as alkyl vinyl ether and the like, hydrocarbon compounds, such as styrene, norbornene, butadiene and the like. The content of the monomer as the third component in the copolymer is 40% by weight or less and preferably 30% by weight or less.

The content of the sum of the unsaturated carboxylic acid anhydride monomer and the monomer as the third component in the copolymer is 50% by weight or less and preferably 40% by weight or less.

The resin mixture utilized as the component (B) in the adhesive resin composition of the invention is obtained by mixing in a molten state of (i) 50 to 90% by weight of a copolymer resin of ethylene/vinyl acetate, (ii) 40 to 9.5% by weight of a binary copolymer resin of ethylene and an α-olefin having 3 to 12 carbon atoms and (iii) 10 to 0.5% by weight of an ethylene/propylene/unconjugated diene terpolymer and has a toluene extraction residue of 10 to 60% by weight.

The a copolymer resin of ethylene/vinyl acetate of the component (i) is a resin obtained by copolymerization of ethylene and vinyl acetate. High pressure polymerization, solution polymerization and emulsion polymerization are known methods for the preparation of the copolymer. Any of these methods may be adopted in the invention.

The content of vinyl acetate in the copolymer resin of the component (i) is generally 0.1 to 80% by weight, preferably 1 to 70% by weight and more preferably 2 to 50% by weight. When the content of vinyl acetate is less than 0.1% by weight, the compatibility tends to be inferior and, when the content is more than 80% by weight, problems like generation of odor and increase of viscosity are likely to occur and the condition is not favorable.

The copolymer resin of the component (i) has a MFR generally of 0.1 to 40 g/10 min and preferably of 0.3 to 30 g/10 min. The MFR is measured according to the method of Japanese Industrial Standard K7210 at 190° C. under the load of 2.16 kg.

The binary copolymer resin of ethylene and an α-olefin of the component (ii) is a resin obtained by copolymerization of ethylene and an α-olefin. The α-olefin has 3 to 12, preferably 4 to 8, carbon atoms. Examples of the preferable α-olefin are 1-butene, 1-hexene, 1-octene and the like.

The content of the α-olefin in the binary copolymer resin is generally 0.1 to 30 mol %, preferably 0.5 to 20 mol % and more preferably 1 to 15 mol % because of the better compatibility.

The binary copolymer resin of the component (ii) has a MFR generally of 0.1 to 60 g/10 min and preferably of 0.3 to 50 g/10 min. The MFR is measured according to the method of Japanese Industrial Standard K7210 at 190° C. under the load of 2.16 kg. The density of the resin is generally 0.91 to 0.945 g/cm$^3$ and preferably 0.915 to 0.935 g/cm$^3$. The degree of crystallization of the resin measured by the wide angle X-ray analysis (the counter method) is 20 to 80% and preferably 30 to 60%.

The ethylene/propylene/unconjugated diene terpolymer of the component (iii) is the material widely known as EPDM. Example of the non-conjugated diene are dicyclopentadiene, 1,4-hexadiene, cyclooctadiene, methylenenorbornene, ethylidenenorbornene and the like. The unconjugated diene can be utilized singly or as a combination of two or more kinds. The content of the unconjugated diene in the terpolymer is generally 0.5 to 10% by weight.

The content of ethylene in the terpolymer is preferably 30 to 90% by weight and more preferably 40 to 80% by weight.

The terpolymer has a Mooney viscosity (ML$_{1+4}$100° C.) generally of 20 to 150 and preferably of 30 to 100.

In the adhesive resin composition of the invention, it is necessary that the components (i), (ii) and (iii) of the component (B) are mixed in a molten state before being utilized for the adhesive resin composition. The ratios of the mixing of the components are selected in the following range: the copolymer resin of ethylene/vinyl acetate of the component (i), 50 to 90% by weight; the binary copolymer resin of ethylene and an α-olefin of the component (ii), 40 to 9.5% by weight; and the ethylene/propylene/unconjugated diene terpolymer, 10 to 0.5% by weight. When the content of the component (i) is less than 50% by weight, improvement of the compatibility tends to be poor and, when the content of the component (i) is more than 90% by weight, problems, such as generation of odor and excessive increase of viscosity, may occur. When the content of the component (ii) is less than 9.5% by weight, improvement of the compatibility and the melt flow property tend to be poor and, when the content of the component (ii) is more than 40% by weight, the interlayer strength is decreased. When the content of the component (iii) is less than 0.5% by weight, the compatibility is poor and the interlayer strength is low and, when the content of the component (iii) is more than 10% by weight, the heat resistance is deteriorated. Thus, the contents of the components outside of the specified ranged are not favorable.

As the method of mixing of the components (i), (ii) and (iii) in a molten state for production of the adhesive resin composition of the invention, conventional methods can be adopted. The components are mixed with a ribbon blender, a tumbler, a Henshel mixer or the like and then mixed in a molten state with a single screw extruder, a multi-screw extruder, a Banbury mixer, mixing rolls, a multi-stage extruder as a combination of these methods or the like apparatus. The methods utilizing the single screw extruder and the double screw extruder are preferable as the method of the melt mixing. The temperature of the melt mixing is generally 150° to 300° C. and preferably 170° to 280° C. The time of mixing in a molten state is generally 0.5 to 15 minutes and preferably 0.8 to 10 minutes.

It is necessary in the adhesive resin composition of invention that the resin mixture obtained by the mixing of the components in a molten state as described above contains 10 to 60% by weight, preferably 10 to 50% by weight, of the toluene extraction residue. When the content of the toluene extraction residue is less than 10% by weight, the compatibility is decreased when the resin is recycled. When the toluene extraction residue is more than 60% by weight, gel is formed. The reason that the content of the toluene extraction residue is varied depending on the contents of the components in the resins and on the contents of the resins in the mixture is not clear. Some kind of reaction is supposed to take place between the resins during the mixing in a molten state.

The resin mixture has a MFR generally of 0.1 to 100 g/10 min and preferably of 0.3 to 80 g/10 min. The MFR is measured according to the method of Japanese Industrial Standard K6760 at 190° C. under the load of 2.16 kg. When the MFR is less than 0.1 g/10 min, the dispersion during the mixing with the component (A) is inferior. When the MFR is more than 100 g/10 min, the compatibility with the component (A) is decreased to cause decrease of the interlayer strength.

The content of the component (B) in the adhesive resin composition obtained from the component (A) and the component (B) is 2 to 98% by weight, preferably 5 to 70% by weight and more preferably 10 to 50% by weight. When the content of the component (B) is less than 2% by weight and the content of the component (A) is more than 98% by weight, the interlayer strength of the layers of the multi-layer laminate, the compatibility between the resins constituting the layers of the laminate and the impact resistance may be deteriorated. When the content of the component (B) is more than 98% by weight and the content of the component (A) is less than 2% by weight, the interlayer strength and the properties during the practical application, such as heat resistance, oil resistance and resistance against chemicals, may be deteriorated.

As the method of blending the components to obtain the adhesive resin composition of the invention, methods generally utilized in the area of resin, such as the methods of using a ribbon blender, a high speed mixer, a kneader, a pelletizer, mixing rolls or the like, may be adopted to form pellets. The components (A) and (B) may be directly charged to a molding machine to produce molded articles.

The adhesive resin composition of the invention obtained as described above is utilized as an adhesive layer in a multi-layer laminate which is molded into films, sheets, tubes, bottles and the like by conventional methods, such as melt molding, compression molding and the like.

To the adhesive resin composition of the invention, generally utilized additives, such as an antioxidant, an ultraviolet light absorbent, a plasticizer, an antistatic agent, a lubricant, a pigment, a filler and the like, may be added according to the necessity.

Examples of the antioxidant are 2,5-di-t-butylhydroquinone, 2,6-di-t-butyl-p-cresol, 4,4-thiobis-(6-t-butylphenol), 2,2-methylene-bis(4-methyl-6-t-butylphenol), octadecyl-3-(3',5'-di-t-butyl-17-hydroxyphenyl)propionate, 4,4'-thiobis-(6-butylphenol) and the like.

Examples of the ultraviolet light absorbent are ethyl-2-cyano-3,3-diphenyl acrylate, 2-(2'-hydroxy-5-methylphenyl)benzotriazol, 2-hydroxy-4-octoxybenzophenone and the like.

Examples of the antistatic agent are pentaerythritol monostearate, sorbitan monopalmitate, oleic acid modified with sulfuric acid, polyethylene oxide, carbowax and the like.

Examples of the lubricant are ethylene-bis-stearoamide, butyl stearate and the like. Examples of the pigments are carbon black, phthalocyanine, quinacridone, indoline, azo pigments, titanium oxide, red iron oxide and the like.

Examples of the filler are glass fiber, asbestos, mica, wallastonite, calcium silicate, aluminum silicate, calcium carbonate and the like.

The adhesive resin composition forms a laminate in combination with at least one resin selected from the group consisting of an olefin/vinyl alcohol copolymer resin, a polyvinylidene chloride resin and a polyamide resin with other thermoplastic resins. Examples of the other thermoplastic resins are high density polyethylene, medium density polyethylene, low density polyethylene, ionomer, polypropylene, copolymers of ethylene and $\alpha$-olefins having 3 to 12 carbon atoms, polystyrene, polyvinyl chloride, polyethylene terephthalate, polycarbonate and the like. Polyethylene and polypropylene among them exhibit remarkable effect of improving the adhesive property.

As the method of laminating the resin having the oxygen gas barrier property and the thermoplastic resin described above, methods such as lamination coating by coextrusion, coextrusion, coinjection molding and the like can be adopted. The multi-layer laminate thus produced is treated by the method of heat stretching by utilizing a vacuum molding machine, a compression molding machine, a stretch blow molding machine or the like, by the method of heat stretching by utilizing a uniaxial stretching machine, a biaxial stretching machine or the like, or by the like other methods.

The multi-layer laminate has a structure, such as A/B/C, A/B/C/B/A and the like, wherein B, C and A stand for the layer of the adhesive resin composition, the layer of the resin having the oxygen gas barrier property and the layer of the other thermoplastic resin, respectively. The two outside layers A in the second structure may comprise the same or different kinds of the thermoplastic resin.

The reason that the adhesive resin which is prepared by recycling the multi-layer laminate or sheet having the oxygen gas barrier property prepared by using the resin composition of the invention has the excellent interlayer strength and compatibility is not elucidated yet. However, it was found that the border of the resin having the oxygen gas barrier property and the polyolefin resin is not so clearly observed as that between a conventional adhesive resin and the polyolefin by the microscopic observation with a scanning electron microscope. This result clearly shows that the resin composition of the invention has the excellent compatibility and it is suggested that this property of the resin composition of the invention enables the recycling of the material.

To summarize the advantages obtained by the invention, the adhesive resin composition is utilized as an adhesive material between layers of a multi-layer laminate and scrap or waste material from the composition or from the multi-layer laminate can be recycled as an adhesive resin composition having excellent interlayer strength and compatibility.

The invention will be understood more readily with reference to the following examples; however, these examples are intended to illustrate the invention and are not to be construed to limit the scope of the invention.

Preparation of ethylene copolymers

The copolymers shown in the following were prepared by the reaction using tertiary-butyl peroxypivalate as the initiator in a 4-liter autoclave-type reactor divided in two zones at the temperature of 190 to 230° C. at the pressure of 1800 to 1950 atmosphere. The unsaturated carboxylic acid anhydride, other monomers except ethylene, the solvent and other ingredients for the polymerization were charged at the upstream of the second stage compressor and charged into the first zone of the reactor together with ethylene.

The unreacted monomers were removed in a high pressure separator and a low pressure separator and the copolymer obtained was formed by an extruder to the pellets as the product. The composition of the copolymer was measured by the infrared spectroscopy and by the $^{13}$C-NMR spectroscopy.

(a) Ethylene/methyl methacrylate/maleic anhydride copolymer
(MFR=8.1 g/10 min, ethylene content=89.1% by weight, methyl methacrylate content=7.8% by weight and maleic anhydride content=3.1% by weight)

(b) Ethylene/ethyl acrylate/maleic anhydride copolymer
(MFR=7.4 g/10 min, ethylene content=90.2% by weight, ethyl methacrylate content=6.2% by weight and maleic anhydride content=3.6% by weight)

(c) Ethylene/maleic anhydride copolymer
(MFR=8.4 g/10 min, ethylene content=95.4% by weight and maleic anhydride content=4.6% by weight)

(d) Ethylene/methyl acrylate/maleic anhydride copolymer
(MFR=3.6 g/10 min, ethylene content=94.1% by weight, methyl methacrylate content=2.0% by weight and maleic anhydride content=3.9% by weight)

Preparation of a resin mixture of the component (B)

(m) In a tumbler, 83.1 parts by weight of an ethylene/vinyl acetate copolymer containing 28.6% by weight of vinyl acetate and having MFR of 8 g/10 min, 11.3 parts by weight of a linear polyethylene containing 5.2 mol % of 1-hexene and having MFR of 9 g/10 min, the degree of crystallization by the wide angle X-ray analysis of 36% and the specific gravity of 0.918 g/cc and 5.6 parts by weight of an EPDM containing 70% by weight of ethylene and 5.6% by weight of dicyclopentadiene were blended and the mixture was pelletized by using an anisotropic biaxial extruder (produced by Nakatani Kikai Co., Ltd., AS-30 mmφ) at the temperature of 190° to 250° C. to obtain a product mixed in a molten state having the MFR of 1 g/10 min, the density of 0.914 g/cc and the toluene extraction residue by a Soxhlet extraction apparatus of 26.3% by weight.

(n) By the same method as that in (m) described above using 66.8 parts by weight of an ethylene/vinyl acetate copolymer containing 27.1% by weight of vinyl acetate and having MFR of 8 g/10 min, 32.4 parts by weight of a linear polyethylene containing 2.9 mol % of 1-hexene and having MFR of 15 g/10 min, the degree of crystallization by the wide angle X-ray analysis of 41% and the specific gravity of 0.928 g/cc and 0.8 parts by weight of an EPDM containing 70% by weight of ethylene and 5.1% by weight of ethylidenenorbornene, a product mixed in a molten state having the MFR of 2 g/10 min, the density of 0.930 g/cc and the toluene extraction residue by a Soxhlet extraction apparatus of 17.7% by weight was obtained.

(o) By the same method as that in (m) described above using 82.6 parts by weight of an ethylene/vinyl acetate copolymer containing 28.1% by weight of vinyl acetate and having MFR of 9 g/10 min, 10.3 parts by weight of a linear polyethylene containing 4.2 mol % of 1-hexene and having MFR of 9 g/10 min, the degree of crystallization by the wide angle X-ray analysis of 38% and the specific gravity of 0.922 g/cc and 7.1 parts by weight of an EPDM containing 75% by weight of ethylene and 4.5% by weight of ethylidenenorbornene, a product mixed in a molten state having the MFR of 1 g/10 min, the density of 0.914 g/cc and the toluene extraction residue by a Soxhlet extraction apparatus of 25.8% by weight was obtained.

(p) By the same method as that in (m) described above using 67.1 parts by weight of an ethylene-vinyl acetate copolymer containing 26.6% by weight of vinyl acetate and having MFR of 9 g/10 min, 32.2 parts by weight of a linear polyethylene containing 5.1 mol % of 1-hexene and having MFR of 13 g/10 min, the degree of crystallization by the wide angle X-ray analysis of 40% and the specific gravity of 0.926 g/cc and 0.7 parts by weight of an EPDM containing 65% by weight of ethylene and 4.1% by weight of dicyclopentadiene, a product mixed in a molten state having the MFR of 2 g/10 min, the density of 0.930 g/cc and the toluene extraction residue by a Soxhlet extraction apparatus of 17.1% by weight was obtained.

EXAMPLE 1

Resin composition (3) of Table 1 as an adhesive layer, low density polyethylene, Sholex F141 ® (produced by Showa Denko K. K., MFR=4.0 g/10 min., density=0.921 g/cc), and EVOH resin, Eval EP-F 101 ® (produced by Kuraray Co., Ltd., ethylene content 32 mol %) were extruded into a laminated film (thickness: 30 μm/30 μm/30 μm) at a temperature of 220° C. by the use of a multi-layer extruding machine (produced by Yoshii Tekko Co., Ltd. diameter 40 mm). The interlayer strength between the adhesive resin layer and the EVOH layer was measured by the us of tensile testing machine (produced by Toyo Seiki Co., Ltd.), and the peeling strength was measured by peeling at a peeling angle of 180° at a peeling rate of 300 mm/min.

TABLE 1

| resin composition number | ethylene copolymer resin or graft modified polyolefin resin | | resin mixture or flexible resin | |
|---|---|---|---|---|
| | symbol | wt. % | symbol | wt. % |
| (1) | (a) | 20 | (p) | 80 |
| (2) | (a) | 50 | (p) | 50 |
| (3) | (a) | 70 | (p) | 30 |
| (4) | (a) | 90 | (p) | 10 |
| (5) | (a) | 95 | (p) | 5 |
| (6) | (a) | 99 | (p) | 1 |
| (7) | (b) | 97 | (p) | 3 |
| (8) | (b) | 75 | (p) | 25 |
| (9) | (b) | 50 | (p) | 50 |
| (10) | (c) | 70 | (p) | 30 |
| (11) | (c) | 90 | (p) | 10 |
| (12) | (a) | 80 | (m) | 20 |
| (13) | (a) | 80 | (n) | 20 |
| (14) | (a) | 80 | (o) | 20 |
| (15) | — | — | (p) | 100 |
| (16) | (a) | 85 | (q) | 15 |
| (17) | (a) | 85 | (r) | 15 |
| (18) | (e) | 75 | (m) | 25 |
| (19) | (d) | 75 | (p) | 25 |
| (20) | (f) | 85 | (o) | 15 |
| (21) | (f) | 90 | (p) | 10 |

TABLE 1-continued

| resin composition number | ethylene copolymer resin or graft modified polyolefin resin symbol | wt. % | resin mixture or flexible resin symbol | wt. % |
|---|---|---|---|---|
| (22) | (g) | 80 | (p) | 20 |
| (23) | (a) | 100 | — | — |
| (24) | (b) | 100 | — | — |
| (25) | (e) | 100 | — | — |
| (26) | (f) | 100 | — | — |
| (27) | (g) | 100 | — | — |
| (28) | (h) | 100 | — | — |

Note:
Graft modified polyolefin resins employed:
(e) Maleic anhydride-modified low density polyethylene (MFR = 2.5 g/10 min., density = 0.91 g/cc)
(f) Maleic anhydride-modified linear low density polyethylene (MFR = 3.5 g/10 min., density = 0.92 g/cc)
(g) Maleic anhydride-modified polypropylene (MFR = 5.5 g/10 min., density = 0.89 g/cc)
(h) Maleic anhydride-modified ethylene/vinyl acetate copolymer (MFR = 4.0 g/10 min., density = 0.928 g/cc)
Flexible resin employed:
(q) Ethylene/propylene copolymer (MFR = 3.6 g/10 min., ethylene content = 70% by weight)
(r) Ethylene/propylene/diene terpolymer (MFR = 2.8 g/10 min., ethylene content = 70% by weight, propylene content = 18% by weight, ethylidenenorbornene content = 12% by weight)

For recovery or re-utilization of scraps, usually, the scraps are molded to form another film, or they are mixed with the resin constituting the outermost layer. Thus, in order to determine whether sufficient interlayer strength can be retained when the scraps are used for the above purposes, the above laminate film was ground by the use of Model DP-2 ® grinder (produced by Daiko Seiki Co., Ltd.). The powder thus obtained was mixed with the above adhesive resin in a proportion of 50% by weight, and then molded into a laminate film (amount of recycled resin: 50% by weight). On the other hand, the above powder alone was used as an adhesive resin (amount of recycled resin: 100% by weight). For the laminate film thus produced, interlayer strength and appearance were measured. The results are shown in Table 2. The peeling strength was measured for 10 test pieces, and the average value is shown in Table 2. At the same time, the appearance of the multi-layer film (particularly formation of fish-eye due to poor compatibility between EVOH or PA and the polyolefin resin) was examined. In this examination, a film made of the recycled material alone was used for the adhesive layer.

TABLE 2

| Run No. | resin composition No. | interlayer strength (g/15 mm width) amount of recycled resin none | 50% by wt. | 100% by wt. | appearance of film, adhesive layer with recycled resin alone |
|---|---|---|---|---|---|
| (Part 1) | | | | | |
| Example 1 | (3) | 985 | 610 | 480 | good |
| Example 2 | (1) | 1160 | 920 | 680 | with a few gels |
| Example 3 | (2) | 1330 | 985 | 720 | with a few gels |
| Example 4 | (4) | no peeling | 1310 | 965 | good |
| Example 5 | (5) | no peeling | no peeling | 1150 | good |
| Example 6 | (7) | no peeling | no peeling | 1090 | good |
| Example 7 | (8) | no peeling | 1020 | 780 | good |
| Example 8 | (9) | 1340 | 960 | 730 | with a few gels |
| Example 9 | (10) | no peeling | 990 | 740 | good |
| Example 10 | (11) | no peeling | no peeling | 1020 | good |
| Example 11 | (12) | no peeling | 1150 | 880 | good |
| Example 12 | (13) | no peeling | 1390 | 980 | good |
| Example 13 | (14) | no peeling | 1030 | 820 | good |
| (Part 2) | | | | | |
| Comparative Example 1 | (6) | 570 | 110 | less than 5 | with many gels |
| Comparative Example 2 | (15) | 0 | 0 | 0 | with many gels |
| Comparative Example 3 | (16) | 880 | 70 | less than 5 | with a few gels |
| Comparative Example 4 | (17) | 820 | 60 | less than 5 | with a few gels |
| Comparative Example 5 | (23) | 1090 | 175 | less than 5 | with many gels |
| Comparative Example 6 | (24) | 910 | 130 | less than 5 | with many gels |
| Comparative Example 7 | (25) | 1310 | 210 | 20 | with many gels |
| Comparative Example 8 | (26) | 1360 | 190 | 20 | with many gels |
| Comparative Example 9 | (27) | 890 | 50 | less than 5 | with many gels |
| Comparative Example 10 | (28) | 1160 | 180 | 20 | with many gels |

Note: "no peeling" means a value of more than 1500.

EXAMPLES 2 TO 13 AND COMPARATIVE EXAMPLES 1 TO 10

Resin compositions shown in Table 1 were processed in the same manner as in Example 1 to produce an adhesive layer. The multi-layer laminates thus obtained were evaluated in the same manner as in Example 1. The results are shown in Table 2.

In Comparative Example 8, the low density polyethylene resin, Sholex F141 ®, was replaced by linear low density polyethylene, Sholex 750F ® (produced by Showa Denko K. K., MFR=4.0 g/10 min, density=0.920 g/cc).

In Comparative Example 9, the low density polyethylene resin, Sholex F141 ®, was replaced by a polypropylene resin, Sho-allomer FA523 ® (produced by Showa Denko K. K., MFR=9.0 g/10 min).

In Comparative Example 10, the low density polyethylene resin, Sholex F141 ®, was replaced by an ethylene/vinyl acetate copolymer resin, Sholex EVA ® (produced by Showa Denko K. K., MFR=7.0 g/10 min, density=0.924 g/cc, vinyl acetate content=7.0% by weight).

EXAMPLES 14 TO 17 AND COMPARATIVE EXAMPLES 11 TO 14

The procedure of Example 1 was repeated, in which EVOH was replaced by a polyamide resin, namely Nylon 6 (produced by Ube Kosan Co., Ltd., specific gravity 1.14; 1022B ®), and the molding temperature was changed to 240° C. The results are shown in Table 3.

TABLE 3

| Run No. | resin composition No. | interlayer strength (g/15 mm width) amount of recycled resin | | | appearance of film, adhesive layer with recycled resin alone |
|---|---|---|---|---|---|
| | | none | 50% by wt. | 100% by wt. | |
| Example 14 | (3) | no peeling | no peeling | 1100 | good |
| Example 15 | (8) | no peeling | no peeling | 1250 | good |
| Example 16 | (14) | no peeling | no peeling | 1290 | good |
| Example 17 | (19) | no peeling | no peeling | 1310 | good |
| Comparative Example 11 | (23) | 1210 | 190 | less than 5 | with many gels |
| Comparative Example 12 | (25) | 1320 | 250 | 25 | with many gels |
| Comparative Example 13 | (26) | 1120 | 160 | less than 5 | with many gels |
| Comparative Example 14 | (6) | 1220 | 180 | less than 5 | with many gels |

Note: "no peeling" means a value of more than 1500.

EXAMPLES 19 TO 20 AND COMPARATIVE EXAMPLES 15 TO 19

The procedure of Example 1 was repeated, in which EVOH was replaced by Eval EP-E105 ® (produced by Kuraray Co., Ltd., ethylene content 44 mol %). The results are shown in Table 4.

TABLE 4

| Run No. | resin composition No. | interlayer strength (g/15 mm width) amount of recycled resin | | | appearance of film, adhesive layer with recycled resin alone |
|---|---|---|---|---|---|
| | | none | 50% by wt. | 100% by wt. | |
| Example 18 | (3) | 1030 | 640 | 510 | good |
| Example 19 | (5) | no peeling | no peeling | 1210 | good |
| Example 20 | (19) | no peeling | no peeling | 1360 | good |
| Comparative Example 15 | (18) | 1380 | 430 | 80 | with a few gels |
| Comparative Example 16 | (20) | 1160 | 320 | 60 | with a few gels |
| Comparative Example 17 | (21) | 1390 | 450 | 110 | with a few gels |
| Comparative Example 18 | (22) | 1220 | 340 | 70 | with a few gels |
| Comparative Example 19 | (25) | 1280 | 210 | 15 | with many gels |

Note: "no peeling" means a value of more than 1500.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An adhesive resin composition which comprises:
   (A) 2 to 98% by weight of an ethylene copolymer resin containing 0.01 to 20% by weight of the unit of an unsaturated carboxylic acid anhydride in the main chain; and
   (B) 98 to 2% by weight of a resin mixture comprising:
      (i) 50 to 90% by weight of a copolymer resin of ethylene/vinyl acetate,
      (ii) 40 to 9.5% by weight of a binary copolymer resin of ethylene and an α-olefin having 3 to 12 carbon atoms, and
      (iii) 10 to 0.5% by weight of an ethylene/propylene/unconjugated diene terpolymer,
   said resin mixture being obtained by mixing (i), (ii) and (iii) in a molten state and having a toluene extraction residue of 10 to 60% by weight.

2. An adhesive resin composition of claim 1 for lamination of at least one resin selected from the group consisting of olefin/vinyl alcohol copolymer resin, polyvinylidene chloride resin and a polyamide resin, with other thermoplastic resins.

* * * * *